United States Patent
Jong et al.

(10) Patent No.: US 11,632,194 B2
(45) Date of Patent: Apr. 18, 2023

(54) SYSTEM AND METHOD FOR SATELLITE COMMUNICATION IN A HELICOPTER

(71) Applicants: James Jehong Jong, North Potomac, MD (US); Channasandra Ravishankar, Clarksburg, MD (US); William Whitmarsh, Germantown, MD (US)

(72) Inventors: James Jehong Jong, North Potomac, MD (US); Channasandra Ravishankar, Clarksburg, MD (US); William Whitmarsh, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 19 days.

(21) Appl. No.: 17/370,936

(22) Filed: Jul. 8, 2021

(65) Prior Publication Data

US 2022/0014309 A1    Jan. 13, 2022

Related U.S. Application Data

(60) Provisional application No. 63/050,639, filed on Jul. 10, 2020.

(51) Int. Cl.
*H04L 1/18* (2023.01)
*H04L 1/00* (2006.01)
(Continued)

(52) U.S. Cl.
CPC .......... *H04L 1/0061* (2013.01); *H04L 1/0003* (2013.01); *H04L 1/0009* (2013.01);
(Continued)

(58) Field of Classification Search
CPC ... H04L 1/0061; H04L 1/0003; H04L 1/0009; H04L 1/1816; H04L 5/0003; H04L 25/03318
See application file for complete search history.

(56) References Cited

U.S. PATENT DOCUMENTS

| | | | | |
|---|---|---|---|---|
| 7,116,724 B2* | 10/2006 | You | ....................... | H04L 1/0065 375/267 |
| 2005/0136856 A1* | 6/2005 | Goldberg | ............. | H04B 7/0842 455/101 |

(Continued)

OTHER PUBLICATIONS

Communications relating to the results of the partial International Search for PCT/US2021/040954.
(Continued)

*Primary Examiner* — Christine T. Tu
(74) *Attorney, Agent, or Firm* — Capitol City Techlaw; Jasbir Singh

(57) ABSTRACT

A receiver and a method for receiving a radio communication is disclosed. The method includes receiving a burst encoded with a robust modulation coding scheme (MCS) as RX signals; generating, for each of the RX signals, a burst SNR, soft decision symbols and a packet; weighing, each of soft decision symbols with a respective burst SNR, to calculate soft combined symbols that are used to generate a Maximal-Ratio Combining (MRC) packet; and selecting, from the packets and the MRC packet, a CRC passed packet as an output. An adaptive dual burst transmitter is disclosed.

21 Claims, 3 Drawing Sheets

---

Transmit a packet as a burst over a path
252

↓

Send, after a hopping delay, the packet as a later burst over the path, wherein the path is subject to a periodic blockage
254

250

(51) Int. Cl.
　　*H04L 5/00*　　　(2006.01)
　　*H04L 25/03*　　(2006.01)
　　*H04L 1/1812*　(2023.01)
(52) U.S. Cl.
　　CPC .......... *H04L 1/1816* (2013.01); *H04L 5/0003* (2013.01); *H04L 25/03318* (2013.01)

(56) References Cited

U.S. PATENT DOCUMENTS

| | | | | |
|---|---|---|---|---|
| 2006/0023775 | A1* | 2/2006 | Rimini | H04W 52/42 375/150 |
| 2007/0142009 | A1 | 6/2007 | Scarpa et al. | |
| 2009/0257487 | A1* | 10/2009 | Wang | H04B 7/0617 375/E7.126 |

OTHER PUBLICATIONS

Stefano Cioni et al: "Advanced Fade Countermeasures for DVB-S2 Systems in Railway Scenarios",EURASIP Journal on Wireless Communications and Networking, vol. 2007, No. 1,Jan. 1, 2007 (Jan. 1, 2007), p. 049718, XP055056607, ISSN: 1687-1499, DOI: 10.1155/2007/49718 paragraph [03.3] paragraph [04.1].

P. Fines, A. Khan, P. Febvre, "Helicopter Propagation Effects and Countermeasures for Reliable Bandwidth Efficient Communications via Satellite," ICSSC 2013.

P. Fines, E. Christofylaki, H. Aghvami, "Bandwidth efficient techniques for helicopter links via satellite," IEEE International Symposium on PIMRC, 2013.

* cited by examiner

SYSTEM AND METHOD FOR SATELLITE COMMUNICATION IN A HELICOPTER

CROSS-REFERENCE TO RELATED APPLICATIONS AND INCORPORATION BY REFERENCE

The present application claims the benefit under 35 U.S.C. 119(e) of U.S. Provisional Application Ser. No. 63/050,639, filed Jul. 10, 2020, which is incorporated herein by reference in its entirety.

FIELD

A system and method based on MF-TDMA multiple access with robust bearers that is well suited for terminal operation under rotary wing blockage is disclosed. Advanced waveforms in both Ku/Ka-band and L-band that work in the presence of rotary wing blockage are disclosed. The system leverages one or more of long and short bursts with a robust bearer that may use a robust MCS (Modulation Coding Scheme), power and link adaptation, adaptive dual burst transmission, hybrid diversity combining reception, and Acknowledged Mode for completely or partially blocked packets in error in the radio layer.

BACKGROUND

Transmission through rotary blades introduces a signal distortion. The magnitude of the distortion depends on various factors, such as, antenna mounting locations, helicopter attitude during maneuvering, number of blades, signal frequency, or the like.

In a helicopter, a line of Sight (LOS) experiences periodic blockage due to rotor's blades. Due to the wavelength difference between Ka-band and L-band signals, an attenuation by the blade blocking in L-band is smaller than an attenuation by the blade blocking in Ka-band. Attenuation of 4~6 dB due to the rotor's blades has been noted in the L-band. Attenuation of ~15 dB due to the rotor's blades has been noted in the Ka-band. Some prior art noted that a blockage attenuation of up to 8 dB may occur when an omni antenna was placed just 20 cm vertically and 0 cm horizontally below the blade. An attenuation for mid and high gain antenna due to diffraction over multiple elements in the antenna has also been noted. Blockage periodicity as short as 29 ms and blockage duration up to 18 ms were suggested for the blade blockage modeling.

Amplitude and phase ripple due to multi-path reflection from rotor's blades is another problem in the L-band; multi-path fading is not a problem in the Ka bank. A blockage caused by the helicopter's fuselage may last longer than blockage due to rotor blades. This could result in 10~20 dB+ attenuation or complete blockage in the L-band or the Ka band. This effect may be minimized by an appropriate antenna placement. Other multi-path reflection such as from the earth's surface and the helicopter fuselage may also occur. A helicopter close to ground is open to signal reflections from the ground and the fuselage, for example, when the helicopter is close to the ocean surface. The effect is expected to be small for mid and high gain antenna.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for receiving a radio communication suffering from a periodic blockage. The method includes receiving a burst encoded with a modulation coding scheme (MCS) as RX signals; generating, for each of the RX signals, a burst SNR, soft decision symbols and a packet; weighing, each of the soft decision symbols with a respective burst SNR, to calculate soft combined symbols and generate a Maximal-Ratio Combining (MRC) packet; and selecting, from the packets and the MRC packet, a CRC passed packet as an output. Other embodiments of this aspect include corresponding computer systems, apparatus, and computer programs recorded on one or more computer storage devices, each configured to perform the actions of the methods.

Implementations may include one or more of the following features. The method where each of the packets is generated by separately CRC checking a demodulation and decoding of a respective one of the RX signals. The method where the MRC packet is generated by CRC checking a decoding of the soft combined symbols. The method where a decoding rate of the MRC packet is less than a decoding rate of the burst. The method where a redundant version of the burst is received as a later burst by the RX signals. The method may discard the later burst. The method where the later burst is transmitted with a different generator matrix than the burst. The method where the receiving is immediately processed without waiting for the later burst. The method where a transmission of the later burst is enabled based on scheduling information. The method where the burst and the later burst are transmitted along different paths without a delay between the burst and the later burst. The method where the RX signals include antenna signals received by spatially diverse antennae. The method may reconstruct the burst by combining the RX signals with a Space Time Block Code (STBC) decoding. The method where the RX signals include a first signal comprising an antenna signal and a second signal including the antenna signal delayed by a delta of transmission times for the different paths. The method where the RX signals include a first signal including an antenna signal and a second signal including the antenna signal delayed by the hopping delay. The method where the burst and the later burst are transmitted along a same path with a delay between the burst and the later burst. The method where the hopping delay is based on a duration and a periodicity of a periodic blockage. Implementations of the described techniques may include hardware, a method or process, or computer software on a computer-accessible medium.

One general aspect include a receiver to receive a radio communication suffering from a periodic blockage The receiver may include RX signals including a burst encoded with a modulation coding scheme (MCS); demodulators to generate, for each of the RX signals, a burst SNR, soft decision symbols and a packet; a combiner to weigh, each of the soft decision symbols with a respective burst SNR, to calculate soft combined symbols that are used to generate a maximal-ratio combining (MRC) packet; and a packet selector to select, from the packets and the MRC packet, a CRC passed packet as an output. Other embodiments of this aspect include corresponding computer systems, apparatus, and computer programs recorded on one or more computer storage devices, each configured to perform the actions of the methods.

Implementations may include one or more of the following features. The receiver where a decoding rate of the MRC packet is less than a decoding rate of the burst. The receiver where a redundant version of the burst is received as a later burst by the RX signals, and the receiver further includes a dual burst combiner to discard the later burst. The receiver where the later burst is transmitted with a different generator matrix than the burst. The receiver where the burst and the later burst are transmitted along a same path with a delay between the burst and the later burst, and the delay is based on a duration and a periodicity of the periodic blockage. The receiver where the RX signals include antenna signals received by spatially diverse antennae. The receiver where the burst is transmitted along different paths having different lines of sight to one or more antennae receiving the RX signals, and the RX signals include a first signal including an antenna signal and a second signal including the antenna signal delayed by a delta of transmission times for the different paths. The receiver where a redundant version of the burst is received as a later burst after a hopping delay has elapsed from a transmission of the burst and the hopping delay is based on a periodicity of the periodic blockage. The receiver where the RX signals include a first signal comprising an antenna signal and a second signal comprising the antenna signal delayed by the hopping delay. Implementations of the described techniques may include hardware, a method or process, or computer software on a computer-accessible medium.

One general aspect includes a method for adaptive dual burst transmitting. The method includes transmitting a packet as a burst over a path; and sending, after a hopping delay, the packet as a later burst over the path, where the path is subject to a periodic blockage. Implementations may include calculating the delay based on a duration and a periodicity of the periodic blockage. The method where the burst is based on a different generator matrix than the later burst. Implementations of the described techniques may include hardware, a method or process, or computer software on a computer-accessible medium.

One general aspect includes a method for transmitting a radio communication suffering from a periodic blockage including: generating signals for a burst using a Space Time Block Code (STBC) encoding; and transmitting the signals from spatially diverse antennae, wherein a count of the antennae is greater than or equal to a count of the signals. Implementations of the described techniques may include hardware, a method or process, or computer software on a computer-accessible medium.

One general aspect includes a method for receiving a radio communication suffering from a periodic blockage including: establishing a RX base link margin for a carrier in the L-band when a periodic blockage is absent; setting a RX UE link margin greater than or equal to 3 dB higher than the RX base link margin; and receiving a burst having the RX UE link margin, wherein the burst is encoded with a robust Modulation Coding Scheme (MCS). Implementations of the described techniques may include hardware, a method or process, or computer software on a computer-accessible medium.

Implementations may include one or more of the following features. The method where when the periodic blockage is absent, the setting of the RX UE link margin to be greater than or equal to 3 dB higher than the RX base link margin is disabled. The method may determine whether the periodic blockage is absent based on a duration and a periodicity of the periodic blockage. The method may calculate the duration and the periodicity based on revolutions per minute for rotary wings and a count of wings in the rotary wings. The method where a burst duration of the burst is greater than a maximum duration of the periodic blockage.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
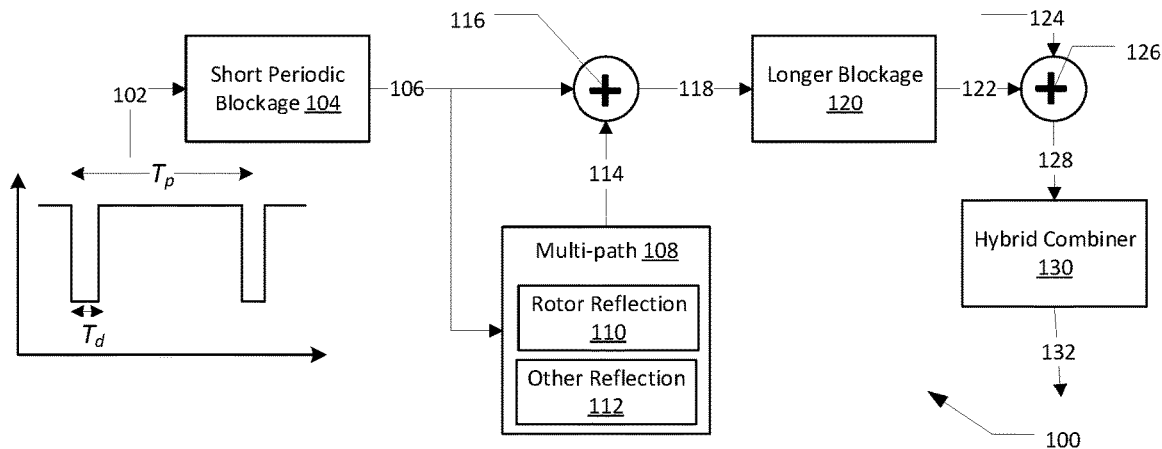
FIG. 1 illustrates an Adaptive Dual Burst (ADB) system to address impairment components of an RX signal unique to a helicopter's operation environment according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Introduction

The present teachings address Line-of-Sight (LOS) losses with periodic blockage due to rotor's blades, multi-path reflection from rotor's blades, longer term blockage caused by the helicopter's fuselage, and multi-path reflection from earth and the helicopter fuselage. The present teachings address a residual impact of an extreme environment. Shock and vibration impact on the oscillator and antenna pointing may be addressed via use of shock and vibration resistant oscillators and antenna systems.

Considering the variety of deployment and flight scenarios, the present teachings provide reliable service for a RX signal subject to a short periodic blockage and a severe blade blockage causing around 5-30 dB (for example 5, 10, 20, 30 dB) signal attenuation without relying on extra link margin. The short periodic blockage may have a periodicity from 30-90, for example, 30, 60, 90 ms. A short blockage duration may be 5-20 ms, for example 5, 10, 15 or 20 ms. A 10 dB~30 dB attenuation may reflect a brief (short as defined above) but significant attenuation due to helicopter fuselage blockage.

In some embodiments, a longer blockage, usually non-periodic and severe, may represent a brief fuselage blockage, a brief antenna pointing misalignment during extreme shock or vibration. The longer blockage may reflect a normal shadowing or complete outage. This effect may be minimized to the extent by optimum antenna placement.

Reliable service may be provided under multi-path fading, for example, by a reflection by rotor blades, ground reflection, fuselage reflection, ocean surface reflection or the like.

An Adaptive Dual Burst (ADB) transmission may be processed by a receiver with hybrid diversity combining teachings to provide high throughputs. The receiver may handle mobility. In some embodiments, throughputs may be increased with carrier aggregation. A higher phase noise mask may address some of residual phase noise effects due to shock or vibration events. In some embodiments, 64-APSK may be used to provide higher spectral efficiencies to provide beyond 1 Mbps when the channel condition permits. Delay sensitive applications may be supported without resorting to ARQ Hybrid-ARQ (HARQ).

FIG. 1 illustrates an Adaptive Dual Burst (ADB) system to address impairment components of an RX signal unique to a helicopter's operation environment according to various embodiments.

An ADB system 100 may include components to address impairment of an RX signal 102 unique to a helicopter's operation environment. The signal 102 may suffer a periodic blockage of Td seconds every Tp seconds. For example, a 4-blade rotary blade spinning at 250 revolutions per minute may experience a 5 dB attenuation due to the periodic blockage of 5 ms (Td) every 60 ms (Tp).

A short periodic blockage module 104 may address the short periodic blockage suffered by the signal 102. An output 106 of the short periodic blockage module 104 may be provided to a multi-path module 108 and a combiner 116. The multi-path module 108 may include a rotor reflection module 110 to address reflections from the rotor blades and an in other reflection module 112 to address reflections from fuselage, ground, ocean, or the like. The multi-path module 108 may be combined into one effective Rician channel. An output 114 of the multi-path module 108 may be provided to the combiner 116. An output 118 of the combiner 116 may be provided to a longer blockage module 120 to address blockages other than short blockages. An output 122 of the longer blockage module 120 may be provided to it combiner 126 that may subtract and an Adaptive White Gaussian Noise (AWGN) signal 124 to produce an output signal 128. The output signal 128 may be provided to a hybrid combiner 130. The hybrid combiner 130 may be included in a receiver (not shown) in a UE (not shown). An output 132 of the hybrid combiner 130 may be provided to a MAC layer for use by upper layers.

Short Duration Burst with ARQ

MF-TDMA multiple access with robust bearers is well suited for terminal operation under rotary wing blockage. Rather than using a long burst duration, a burst having a short burst may be used to minimize a blockage probability. The duration of a short burst may be 10 ms or less, less than a duration of the periodic blockage generally suffered, 5 ms, less than 5 ms or the like. An exemplary short burst is PNB(5,3) as defined in the ETSI TS 101 376-5-2: GEO-Mobile Radio Interface Specifications (Release 3); Third Generation Satellite Packet Radio Service; Part 5: Radio interface physical layer specifications; Sub-part 2: Multiplexing and Multiple Access; Stage 2 Service Description; GMR-1 3G 45.002. The duration of a long burst may be greater than 10 ms, greater than a duration of the periodic blockage suffered, or the like.

The short burst may be coupled with a robust MCS (Modulation Coding Scheme) that uses a lower order modulation and code rate. Herein, modulations that can transmit less than or equal to 4 different symbols are lower order modulations. Exemplary lower order modulations for a robust MCS include BPSK, QPSK. In exemplary embodiments, the robust MCS (for example, QPSK) may be coupled with a low code rate Low-density parity-check code (LDPC) to added margins for a link closure during blockage and during reflection induced fading, for example, encoding with QPSK at a $1/2$-rate. Exemplary, low code rates are 2/1, 1/1, 1/2, 1/3, 1/4 and the like. A robust MCS with a low code rate may be used for PNB(5,x) bearers.

For a helicopter terminal type, a gateway may adjust a power control to provide a target SNR and link adaptation based on the MCS selection. In some embodiments, for L-band operation sufficient link margin at the target may be provided to In some embodiments, a MAC/RLC acknowledge mode for blocked packets in error may be used. Retransmission of errored packets may significantly improve reliability.

The robust mechanism of Common Control Channels (CCCHs) may be used to provide for terminal operation under rotary wing blockage. CCCHs provide a high link margin due to low SNR operation and narrow band. CCCHs may also provide a repeated transmission structure of 5 ms FCCH and 10 ms BCCH bursts. In some embodiments, a retry scheme with back-off for 15 ms RACH and 5 ms PRACH bursts may be used. Due to narrowband nature of RACH and PRACH, a link margin may be sufficient to overcome periodic blade blockage. A retry scheme for 10 ms PCH and 10 ms AGCH bursts may be used.

Assuming 100% of blocked messages are non-recoverable, the average success probability of a message being non-blocked is around 83% (i.e., blocking probability of 17%). The 100% loss of blocked messages is a conservative assumption, in particular, when the link has sufficient margin. The probability analysis assumes that a blockage period (Tp of FIG. 1) is uniformly distributed between 50~80 ms with a blocking duration between 4.5 ms 6.5 ms (Td of FIG. 1), and that during blockage duration, up to three bursts could be lost. It is also assumed that a gateway transmits bursts continuously to the terminal suffering periodic blockage.

In case bursts are lost due to severe blockage, ARQ retransmission significantly improves reliability to more than 96% success rate with up to one retransmission or more than 99% success rate with up to two retransmissions.

Figure 1A:
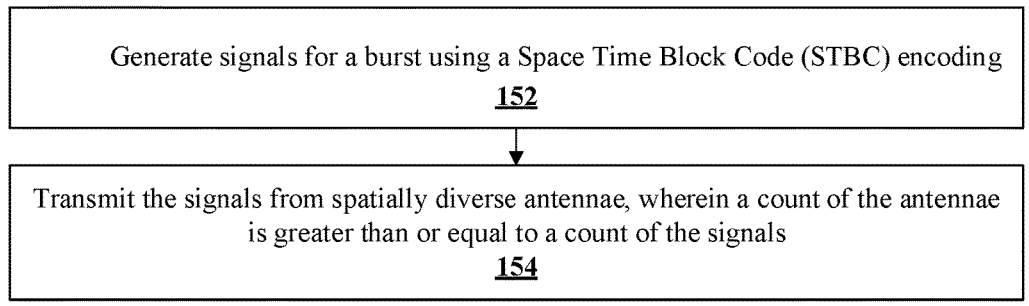
FIG. 1A illustrates a method for transmitting a radio communication suffering from a periodic blockage according to various embodiments.

FIG. 1A illustrates a method for transmitting a radio communication suffering from a periodic blockage according to various embodiments.

A method 150 for transmitting a radio communication suffering from a periodic blockage may include an operation 152 to generate signals for a burst using a STBC encoding. The method 150 may include an operation 154 to transmit the signals from spatially diverse antennae, wherein a count of the antennae is greater than or equal to a count of the signals.

Adaptive Dual Burst Transmission System

In adaptive dual burst combining, a data packet is redundantly sent as a burst and a later/redundant burst after a delay when the burst and the later burst travel over the same path. In some embodiments of adaptive dual burst combining, the burst and the later burst are sent over parallel paths without delay. On the receiving side, a first arriving burst from the burst and the later burst is selected and may be immediately processed towards an end application, such as an application in the upper layers. Later or non-first bursts of the data packet, if received, are discarded, for example, after demodulating and decoding the later burst. A significant performance improvement may be gained through the immediate processing of the first arriving packet.

The adaptive dual transmission system may be adaptive and provide redundancy at burst level with a time gap in transmission. Transmission recovery may be achieved without an additional link margin to absorb blockage attenuation. Carrier aggregation and adaptive transmission to maximize throughput may be used. A higher data rate when blade blockage is not severe may be achieved. Smart scheduling may adaptively enable and disable adaptive dual burst transmissions. In some embodiments, a hopping delay in the adaptive dual transmission system may take into consideration a range of main rotor blade RPMs and range of deployment scenarios with different shadow depths (typically a maximum RPM of helicopter main rotor blade is less than 500 RPM). The adaptive dual transmission system may recover transmitted information even if one of the transmissions is completely wiped out. A complimentary dual burst combiner may be included in a receiver in a UE. In some embodiments, the adaptive dual burst transmission system may be used when there is no spatial diversity at the UE, in other words, the adaptive dual burst transmission system need not be used when there is more than one antenna at the receiver.

Figure 2A:
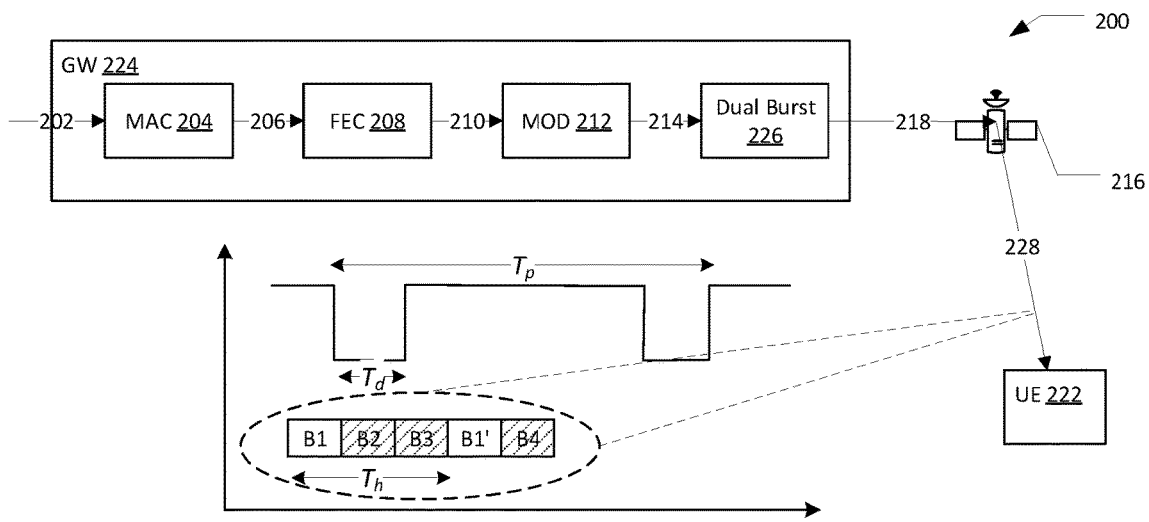
FIG. 2A illustrates an adaptive dual burst transmission system according to various embodiments.

FIG. 2A illustrates an adaptive dual burst transmission system according to various embodiments.

An adaptive dual burst transmission system 200 may include a gateway 224, a UE 222 and an adaptive dual burst module 226. The adaptive dual burst module 226 may be disposed in the gateway 224. In some embodiments, the adaptive dual burst module 226 may be disposed in the UE 222. Details herein are discussed with respect to transmissions from the gateway 2224 to the UE 222. Same details are applicable to transmissions from the UE 222 to the gateway 224.

Packets 202 received from upper layers (not shown) at a Media Access Control (MAC) layer 204 may be formed into a MAC message 206 that is processed by a Forward Error Correction (FEC) module 208. The FEC module 208 may use one or more of Cyclic Redundancy Check (CRC), LDPC, rate matching, interleaving, scrambling or the like to encode the MAC message 206 to generate an encoded message 210. A modulator (MOD) 212 modulates and burst formats the encoded message 210 as a burst 214 that is routed to adaptive dual burst module 226 for transmission via an uplink 218 to a relay 216. The relay 216 may be a satellite, a high-attitude platform, a terrestrial antenna, or the like. The uplink 218 may include a burst 214 (included as B1 in downlink 228) and a copy of the burst 214 (included as B1 in downlink 228) transmitted after hopping delay $T_h$ has elapsed. Each of the burst B1 and the B1' includes the encoded message 218. The burst B1 and B1' arrive at the UE 222 separated by the hopping delay $T_h$ in the downlink 228.

A receiver in the UE 222 may include a dual burst combiner (see FIG. 3) to select the more robust of burst B1 and B1', when the dual transmission indicator is set, received by the UE 222. The UE 222 may include a diversity combining system (FIG. 3).

The adaptive dual burst module 226 determines whether a dual burst is warranted based on scheduling information from a MF-TDMA scheduler. The determination may be done on a burst-by-burst basis, or for a group of bursts. The determination may provide a value for a hopping delay $T_h$. When a dual burst is warranted, the burst 214 may be scheduled for transmission after $T_h$ has elapsed. For example, burst B1 may in FIG. 2A, may be designated for dual transmission. As such, a copy of burst B1 would be transmitted as burst B1' after $T_h$ has elapsed. Other bursts, for example, bursts B2, B3 and B4 may be designated for single transmission. In some embodiments, a dual transmission indicator and an order of transmission may be set in the bursts B1 and B1', while a dual transmission indicator is not set in the bursts B2, B3 and B4. In some embodiments, the order of transmission of B1 may have a value 0, while B1' has a value of 1 for the order of transmission. The dual transmission indicator and the order of transmission may be disposed in a burst header (not shown) encoded with a more robust MCS than a MCS used to encode a burst payload (not shown). In some embodiments, the dual transmission indicator and the order of transmission may be disposed in a PUI (not shown) per GMR-1 3G 45.002, which may be more robust. The hopping delay $T_h$ may be provided to the adaptive dual burst combiner of the UE 222.

Figure 2B:
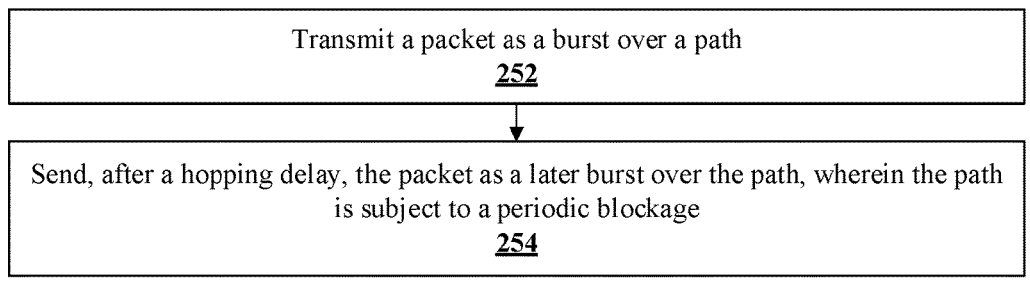
FIG. 2B illustrates a method for transmitting a radio transmission according to various embodiments.

FIG. 2B illustrates a method for transmitting a radio transmission according to various embodiments.

A method 250 for transmitting a radio transmission may include an operation 252 to transmit a packet as a burst over a path. The method 250 may include an operation 254 to send, after a delay, the packet as a later burst over the path, wherein the path is subject to a periodic blockage.

Diversity System

A receiver may include hybrid diversity combining and dual burst combining. Diversity combining combines multiple received signals of a diversity reception device into a single improved signal. Diversity combining provides diversity gain under multi-path fading and array gain in LoS AWGN. Immunity from losses attributable to a burst being severely distorted, for example, by blade blockage, may be gained. There are various schemes for diversity combining. In Maximal-ratio Combining (MRC), the received signals are weighted with respect to their SNR and then summed. In selection combining, of the N received signals, the strongest signal is selected.

In hybrid combining, the results of the MRC are added as a choice in the selection combining of the N received signals. Hybrid combining uses additional decoders for extra gain and means for direct message content check. The hybrid combining not only provides additional gain over MRC but enables redundant message check.

Figure 3A:
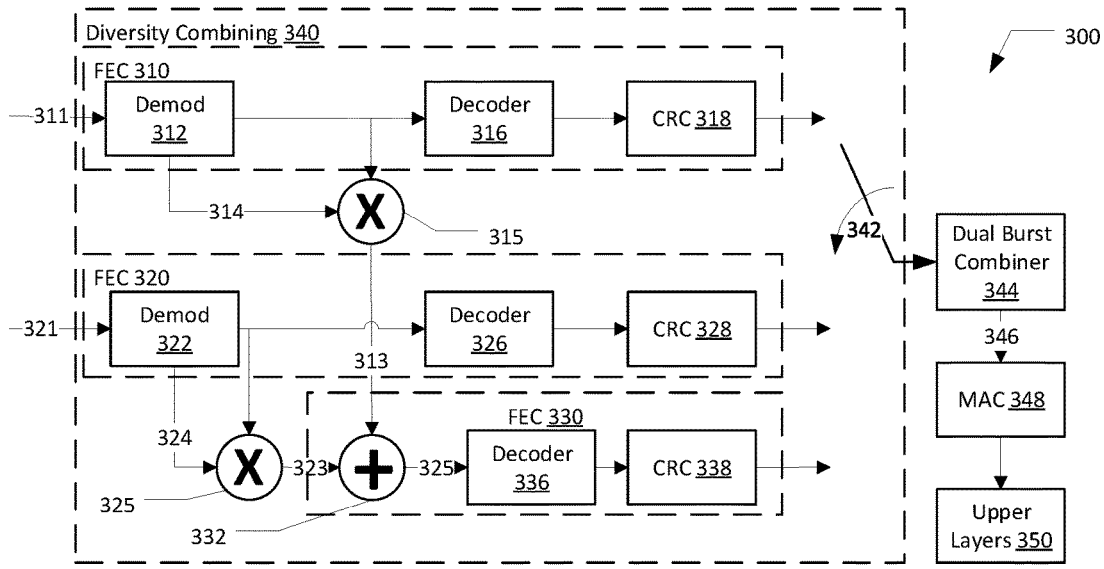
FIG. 3A illustrates a hybrid receiver including a diversity combiner and an adaptive dual burst combiner according to various embodiments.

FIG. 3A illustrates a hybrid receiver including a diversity combiner and a dual burst combiner according to various embodiments.

A hybrid receiver 300 may including a diversity combiner 340 and a dual burst combiner 344. The diversity combiner 340 may include a plurality of demodulation/decoding chains, for example, chain 310, chain 320 and chain 330. In the diversity combiner 340, a packet selector 342 may select a CRC passed decoded packet output from each of the chains 310, 320 and 330. Chains 310, 320 may be considered exemplars of a general error correcting implementation for RF. Chain 330 may be considered an exemplar of an MRC error correcting implementation.

Chain 310 may process an RX signal 311 using a demodulator 312, a decoder 316 and a CRC detector 318 to output a CRC passed decoded packet. Soft decision symbols 313 may be generated by weighing a burst SNR 314 of the RX signal 311. Chain 320 may process the RX signal 321 using a demodulator 322, a decoder 326 and a CRC detector 328 to output a CRC passed decoded packet. Soft decision symbols 323 may be generated by weighing a burst SNR 324 of the RX signal 321.

Chain 330 may include a combiner 332, a decoder 336 and a CRC detector 338 to output a CRC passed decoded packet. A weight matrix 315 based on the burst SNR 314 is applied to soft symbols from demodulator 312 to calculate soft decision symbols 313. A weight matrix 325 based on the burst SNR 324 is applied to soft symbols from demodulator 322 to calculate soft decision symbols 323. Rather than directly using an RX signal from an antenna, the combiner 332 combines the weighted soft decision symbols 313, 323 to provide soft combined symbols 325 to the decoder 336. The combiner 332 adds the output the soft decision symbols 313, 323 corresponding to parity bits of chain 310 and parity bits of chain 320, respectively. In some embodiments, the decoder 336 processes the soft combined symbols 325 through a lower rate FEC decoder than both the decoder 316 and the decoder 326. For example, if chain 310 was Rate ½ and chain 320 was Rate ½, then chain 330 would be using Rate ⅓ decoding. The soft decision symbols 313, 323 can be soft combined, when an error coding scheme produces a systematic code. One example of an error coding scheme produces a systematic code is LDPC.

In some embodiments, a signal received at one antenna (no spatial diversity) may be used for RX signal 311 and RX signal 321. When a dual burst indicator is not set, RX signal 311 and RX signal 321 are the same signal and chains 310 and 320 should provide identical results. When the dual burst indicator is set, redundant bursts of a dual transmission may be synchronized based on the hopping delay Th. In one embodiment, a delay equal to the hopping delay Th may be added to RX signal 311 so that a processing of redundant copies of a burst are performed to the chains 310 and 320 at the same time.

When two of the chains 310, 320 and 330 indicate that CRC check failed, the packet from the CRC passed chain is selected by the packet selector 342. When two or more of the chains 310, 320 and 330 output CRC passed decoded packets that are identical, the packet selector 342 may select any of the CRC passed decoded packets. When chains 310, 320 and 330 output CRC passed decoded packets that are not identical, a synchronization error may exist between RX signal 311 and RX signal 321.

In some embodiments, RX signals 311, 321 are received by multiple antennae (not shown) disposed strategically around the fuselage. The spatial diversity provided by the multiple antennae can be used to account for the periodic blockage, for example, when a periodic blockage of a first antenna does not overlap with a periodic blockage of a second antenna. A chain such as chain 310 may be used for each antenna disposed in the fuselage, whose output may be provided as a choice to the packet selector 342.

The dual burst combiner 344 eliminates redundant (or duplicate) messages. In some embodiments, the dual burst transmission may be selectively, for example with smart scheduling, transitioned to single burst transmission and vice versa. In some embodiments, the dual burst combiner 344 may eliminate redundant messages when a dual burst transmission indication is set. An output 346 of the dual burst combiner 344 may be used to determine link quality metrics. The output 346 may be provided as a decoded message to a MAC layer 348 and upper layers 350 in the hybrid receiver 300.

Figure 3B:
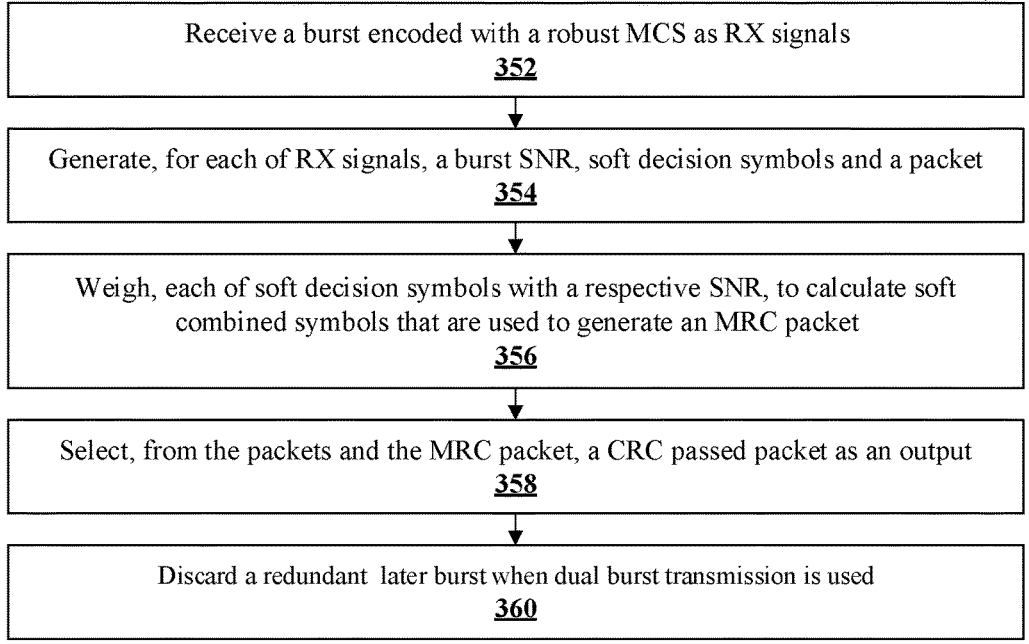
FIG. 3B illustrates a method for receiving a radio transmission according to various embodiments.
Figure 3B:
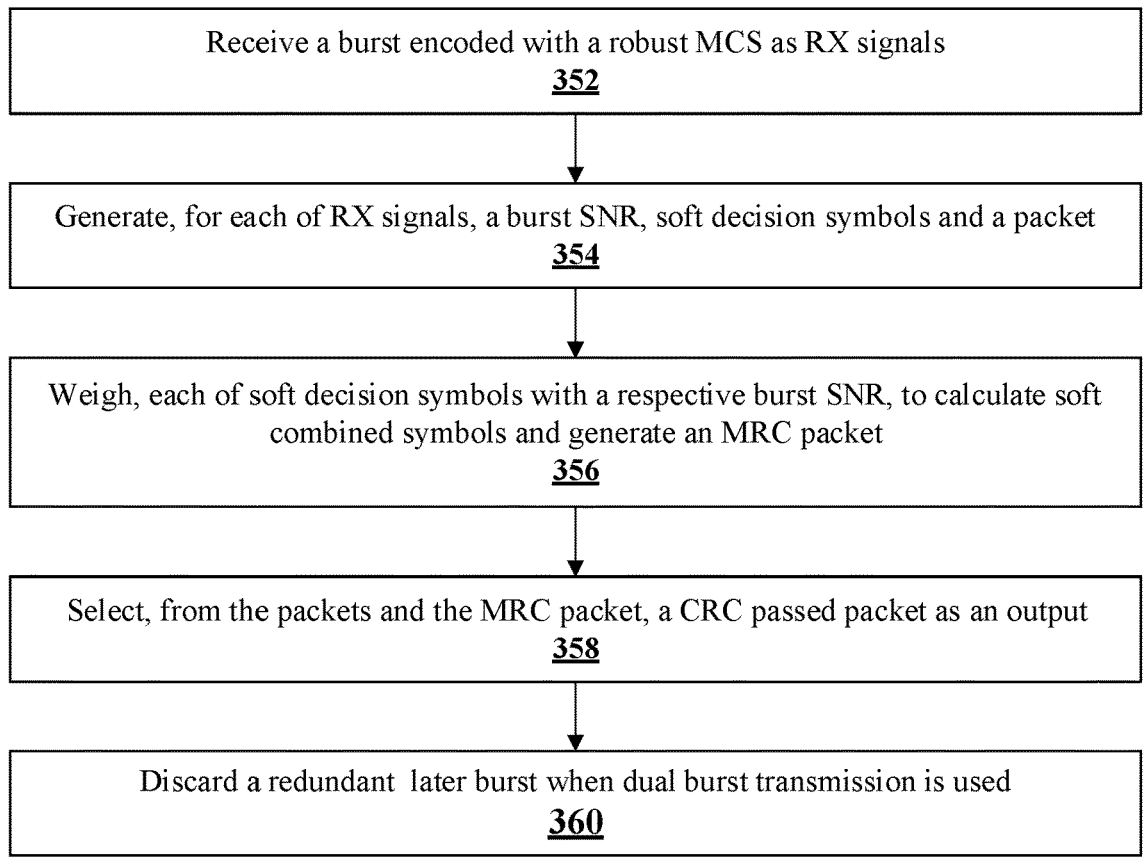

FIG. 3B illustrates a method for receiving a radio transmission according to various embodiments.

A method 350 for receiving a radio transmission may include an operation 352 to receive a burst encoded with a MCS as RX signals. The method 350 may an operation 354 to generate, for each the RX signals, a burst SNR, soft decision symbols and a packet. The generating of operation 354 may be performed using demodulation, decoding and CRC checking. The method 350 may an operation 356 to weigh, each of soft decision symbols with a respective SNR, to calculate soft combined symbols that are used to generate an MRC packet. The method 350 may an operation 358 to select, from the packets and the MRC packet, a CRC passed packet as an output. The method 350 may include an operation 360 to discard a redundant later burst when dual burst transmission is used.

Fuselage Blocking

Figure 4:
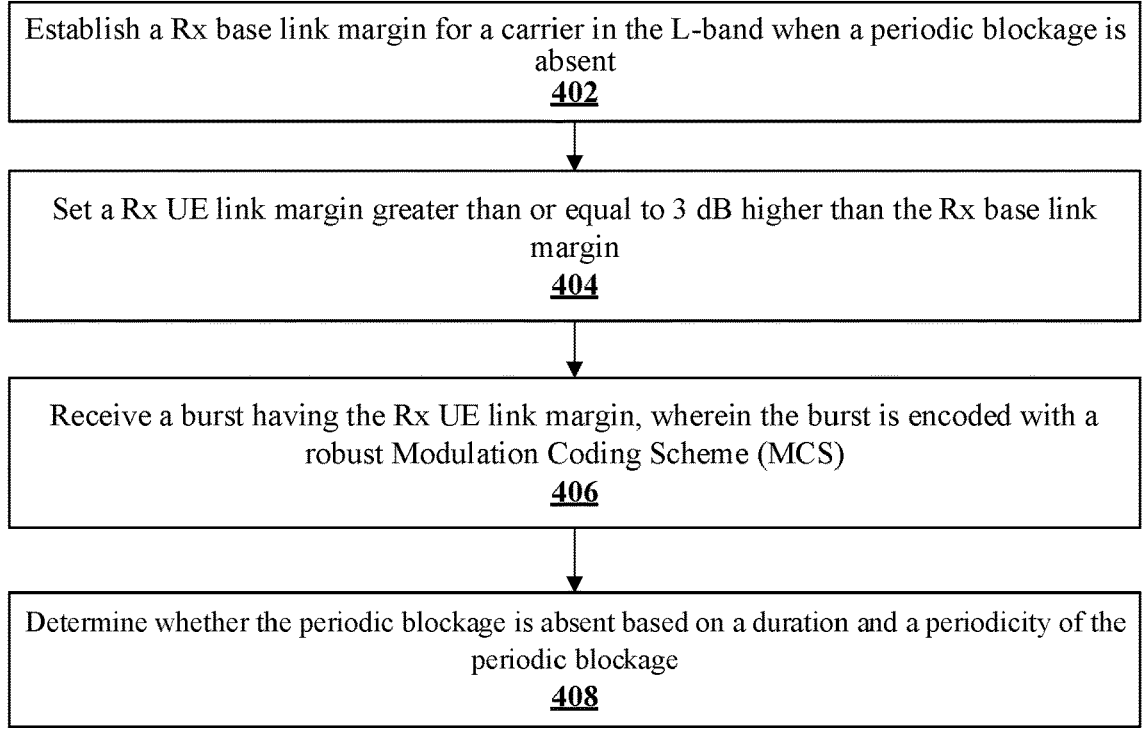
FIG. 4 illustrates a method for radio communication suffering from a periodic blockage according to various embodiments.

The adaptive dual burst transmission with hybrid combining is applicable to multiple antenna techniques. In addition to time diversity, spatial diversity may be exploited with multiple antennae. Hybrid diversity combining may use both time and spatial diversity for most reliable performance. For example, two antennae may be optimally placed on a helicopter to overcome signal due to fuselage and blade blockage. For a RX signal, a helicopter UE may use hybrid diversity combining or RX selection diversity. See FIG. 3A discussion above with respect to RX signals from multiple antennae. For a Tx signal, a helicopter UE use 2×1 Alamouti STBC (Space Time Block Code) or TX selection diversity (FIG. 4). All these can be used with ADB for improved reliability.

Multiple Antenna Transmission and Reception

In some scenarios, it is possible that in addition to blade blockage, there could be long term blockage from the fuselage depending on the relative orientation of the antenna with respect to a satellite. In such cases, the shadow depth is deep and for long duration of time such that the ADB may not help. However, to avoid packet losses, the transmitter on the helicopter can determine eligibility to transmit by simply observing a downlink SNR. The UT may check if the downlink is blocked and if so, will not transmit on uplink. In some embodiments, this measurement-based will approach may delay the decision to stop transmitting to the network. In some embodiments, the UT decides to transmit based on the direction in which the helicopter is heading, the location of the helicopter and the direction in which the satellite is. Since heading information and location (including height) information is available to the UT from the navigation system of the helicopter, it is easy to determine if there is a fuselage blockage to the intended satellite. If a fuselage blockage is detected, the UT delays transmitting to the satellite until blockage is cleared, thereby preventing packet losses.

FIG. 4 illustrates a method for radio communication suffering from a periodic blockage according to various embodiments.

A method 400 for radio communication suffering from a periodic blockage may include an operation 402 to establish a RX base link margin for a carrier in the L-band when a periodic blockage is absent. The method 400 may include an operation 404 to set a RX UE link margin greater than or equal to 3 dB higher than the RX base link margin. The method 400 may include an operation 406 to receive a burst having the RX UE link margin, wherein the burst is encoded with a robust Modulation Coding Scheme (MCS). The method 400 may include an operation 408 to determine whether the periodic blockage is absent based on a duration and a periodicity of the periodic blockage.

System Configurations

For this section, a dual burst transmission implicitly implies the same message is transmitted over two bursts with a time gap or hopping delay. The satellite acts as a signal relay and its antenna/antennae configuration are omitted in the following tables. For a forward link (gateway to terminal), single TX configurations may include the following.

| GW TX | Terminal RX | Total # of decoders for hybrid combining receiver |
|---|---|---|
| Dual burst transmission over 1 TX antenna | Dual burst reception over 1 RX antenna using hybrid diversity combining | Three |
| Single burst transmission over 1 TX antenna | Single burst reception over 2 RX antenna using hybrid diversity combining | Three |
| Dual burst transmission over 1 TX antenna | Dual burst reception over 1 RX antenna using hybrid diversity combining | Three |
| Dual burst transmission over 1 TX antenna | Dual burst reception over 2 RX antenna using hybrid diversity combining | Five |

For a return link (terminal to gateway), single TX configurations may include the following.

| Terminal TX | GW RX | Total # of decoders for hybrid combining receiver |
|---|---|---|
| Dual burst transmission over 1 TX antenna | Dual burst reception over 1 RX antenna using hybrid diversity combining | Three |
| Single burst transmission over 1 TX antenna | Single burst reception over 2 RX antenna using hybrid diversity combining | Three |
| Dual burst transmission over 1 TX antenna | Dual burst reception over 1 RX antenna using hybrid diversity combining | Three |
| Dual burst transmission over 1 TX antenna | Dual burst reception over 2 RX antenna using hybrid diversity combining (Sat and feeder link need to support dual polarization) | Five |

In some embodiments, transmit diversity may be provided using STBC when spatially diverse antennae may be deployed. The STBC-based transmit diversity may be used on the return link (terminal to gateway). For the return link (terminal to gateway), transmit diversity using STBC configurations may include the following.

| Terminal TX | GW RX | Total # of decoders for hybrid combining receiver |
|---|---|---|
| Single burst transmission over 2 TX antenna | Single burst reception over 1 RX antenna | One (no hybrid combining) |
| Dual burst transmission over 2 TX antenna | Dual burst reception over 1 RX antenna using hybrid diversity combining | Three |

| Terminal TX | GW RX | Total # of decoders for hybrid combining receiver |
|---|---|---|
| Dual burst transmission over 2 TX antenna | Dual burst reception over 2 RX antenna using hybrid diversity combining (Sat and feeder link need to support dual polarization) | Five |

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for receiving a radio communication suffering from a periodic blockage, the method comprising:
   in a receiver:
   receiving a burst as RX signals;
   generating, for each of the RX signals, a burst SNR, soft decision symbols and a packet;
   weighing each of the soft decision symbols with a respective burst SNR to calculate soft combined symbols that are used to generate a Maximal-Ratio Combining (MRC) packet; and
   selecting, from the packets and the MRC packet, a packet as an output.

2. The method of claim 1, wherein the burst is encoded with a robust bearer using a robust Modulation and Coding Scheme (MC S) coupled with a low code rate Low-density parity-check code (LDPC).

3. The method of claim 1, where each of the packets is generated by separately Cyclic Redundancy Check (CRC) checking a demodulation and decoding of a respective one of the RX signals.

4. The method of claim 3, wherein the selecting selects from the packets that passed the CRC checking.

5. The method of claim 1, wherein the MRC packet is generated by CRC checking a decoding of the soft combined symbols and a decoding rate of the MRC packet is less than a decoding rate of the burst.

6. The method of claim 1, wherein the RX signals comprise antenna signals received by spatially diverse antennae.

7. The method of claim 6, further comprising reconstructing the burst by combining the RX signals with a Space Time Block Code (STBC) decoding.

8. The method of claim 1, wherein the burst is transmitted along different paths having different lines of sight to one or more antennae receiving the RX signals, and the RX signals comprise a first signal comprising an antenna signal and a second signal comprising the antenna signal delayed by a delta of transmission times for the different paths.

9. The method of claim 1, wherein a redundant version of the burst is received as a later burst after a hopping delay has elapsed from a transmission of the burst.

10. The method of claim 9, wherein the RX signals comprise a first signal comprising an antenna signal and a second signal comprising the antenna signal delayed by the hopping delay.

11. The method of claim 9, wherein the hopping delay is based on a duration and a periodicity of the periodic blockage.

12. The method of claim 9, wherein the later burst is transmitted with a generator matrix different from a generator matrix associated with the burst.

13. A receiver to receive a radio communication suffering from a periodic blockage, the receiver comprising:
   receiving RX signals comprising a burst;
   demodulators to generate, for each of the RX signals, a burst SNR, soft decision symbols and a packet;
   a combiner to weigh each of the soft decision symbols with a respective burst SNR to calculate soft combined symbols that are used to generate a Maximal-Ratio Combining (MRC) packet; and
   a packet selector to select, from the packets and the MRC packet, a packet as an output.

14. The receiver of claim 13, wherein the RX signals comprise antenna signals received by spatially diverse antennae.

15. The receiver of claim 13, wherein the burst is transmitted along different paths having different lines of sight to one or more antennae receiving the RX signals, and the RX signals comprise a first signal comprising an antenna signal and a second signal comprising the antenna signal delayed by a delta of transmission times for the different paths.

16. The receiver of claim 13, wherein a redundant version of the burst is received as a later burst after a hopping delay has elapsed from a transmission of the burst, the hopping delay is based on a periodicity of the periodic blockage, and the RX signals comprise a first signal comprising an antenna signal and a second signal comprising the antenna signal delayed by the hopping delay.

17. A method for adaptive dual burst transmitting, the method comprising:
   transmitting a packet as a burst over a path; and
   sending, after a hopping delay, the packet as a later burst over the path,
   wherein the path is subject to a periodic blockage.

18. The method of claim 17, wherein each of the burst and the later burst comprise a burst header comprising an order of transmission.

19. The method of claim 17, wherein a transmission of the later burst is enabled based on scheduling information.

20. The method of claim 17, wherein the hopping delay is based on a periodicity of the periodic blockage.

21. The method of claim 17, wherein the transmitting is enabled based on a heading of a terminal, a location of a helicopter and a satellite direction from the antenna.

* * * * *